(12) United States Patent
Thompson

(10) Patent No.: US 11,084,268 B1
(45) Date of Patent: Aug. 10, 2021

(54) ENGINEERED WOOD PRODUCT AND METHOD OF MAKING SAME

(71) Applicant: Bryan Thompson, Birmingham, AL (US)

(72) Inventor: Bryan Thompson, Birmingham, AL (US)

( * ) Notice: Subject to any disclaimer, the term of this patent is extended or adjusted under 35 U.S.C. 154(b) by 0 days.

(21) Appl. No.: 16/945,690

(22) Filed: Jul. 31, 2020

Related U.S. Application Data

(60) Provisional application No. 62/880,924, filed on Jul. 31, 2019.

(51) Int. Cl.
| | |
|---|---|
| *B32B 21/10* | (2006.01) |
| *B32B 37/12* | (2006.01) |
| *C09J 7/32* | (2018.01) |
| *C09J 11/04* | (2006.01) |
| *C09J 7/10* | (2018.01) |
| *B32B 37/10* | (2006.01) |
| *B32B 38/00* | (2006.01) |
| *B32B 38/08* | (2006.01) |
| *C09J 5/02* | (2006.01) |

(52) U.S. Cl.
CPC .......... *B32B 37/1292* (2013.01); *B32B 37/10* (2013.01); *B32B 38/0004* (2013.01); *B32B 38/0012* (2013.01); *B32B 38/08* (2013.01); *C09J 5/02* (2013.01); *C09J 7/10* (2018.01); *C09J 7/32* (2018.01); *C09J 11/04* (2013.01); *B32B 21/10* (2013.01); *B32B 2037/1261* (2013.01); *B32B 2038/0056* (2013.01); *B32B 2038/0076* (2013.01); *B32B 2313/04* (2013.01); *B32B 2315/085* (2013.01); *B32B 2317/16* (2013.01); *B32B 2375/00* (2013.01); *C09J 2301/306* (2020.08); *C09J 2301/408* (2020.08); *C09J 2400/12* (2013.01); *C09J 2400/14* (2013.01); *C09J 2400/306* (2013.01); *C09J 2475/00* (2013.01)

(58) Field of Classification Search
CPC ............ B32B 21/10; B32B 2037/1261; B32B 2038/0056; B32B 2317/16
See application file for complete search history.

(56) References Cited

U.S. PATENT DOCUMENTS

| | | | |
|---|---|---|---|
| 6,287,677 B1* | 9/2001 | Ishihara | B27D 1/04 428/292.1 |
| 2002/0015819 A1* | 2/2002 | Edwards | B27D 1/00 428/114 |
| 2014/0199558 A1* | 7/2014 | Pervan | E04C 2/246 428/530 |

* cited by examiner

*Primary Examiner* — Scott W Dodds
(74) *Attorney, Agent, or Firm* — C. Brandon Browning; Maynard, Cooper & Gale, PC

(57) ABSTRACT

A novel engineered wood product and method of making same that withstands the stresses, both natural and man-made, that cause warp, twist and bow.

4 Claims, 20 Drawing Sheets

ENGINEERED WOOD PRODUCT AND METHOD OF MAKING SAME

CROSS REFERENCE TO RELATED APPLICATIONS

This application claims priority to U.S. Provisional Patent Application No. 62/880,924, filed Jul. 31, 2019, the entire contents of which are incorporated herein by reference.

FIELD OF INVENTION

The present invention is directed to a composite wood product configured for withstanding stresses that cause warp, twist and bow, for example, stresses experienced by doors located between the interior and exterior of buildings and, more particularly, to a method of adhering a first solid wood board to a second solid wood board.

SUMMARY OF THE INVENTION

The present invention is directed to a novel engineered wood product and method of making same that withstands the stresses, both natural and man-made, that cause warp, twist and bow. The stabilization method produces a wood product that is exceptionally strong in both shear strength and tensile strength. The wood products produced by this process withstand extreme temperature differentials between the "faces" of the wood, e.g., as experienced between an outside face and an interior face of an exterior door, and maintains its intended shape. The process may be used with any number of solid wood slabs, such as white oak, alder, mahogany and the like. The process is especially useful when applied to wood species that are difficult to use in construction due to the high potential for warp and twist. Thus, the present invention may be used to stabilize lumber species that are notorious for warp and twist, such as hickory and white Oak.

DETAILED DESCRIPTION OF THE INVENTION

Components of Finished Product

The engineered composite wood product of the present invention includes:

1. Two or more wood slabs or boards composed of dimensional lumber having a moisture content (MC) of 7%+/−2%;
2. Warp bias fiberglass, otherwise known as unidirectional glass. The fiberglass is provided as a yarn and runs lengthwise to form a woven fabric. The yarns have long lengths and run approximately parallel; and
3. Polyurethane Resin (PUR). PUR is a polymer composed of organic units joined by carbamate (urethane) links. While most polyurethanes are thermosetting polymers that do not melt when heated, thermoplastic polyurethanes are also available. Polyurethane polymers are traditionally and most commonly formed by reacting a di- or tri poly-isocyanate with a polyol. Since polyurethanes contain two types of monomers, which polymerise one after the other, they are classed as alternating copolymers. Both the isocyanates and polyols used to make polyurethanes contain, on average, two or more functional groups per molecule. Polyurethanes are used in the manufacture of high-resilience foam seating, rigid foam insulation panels, microcellular foam seals and gaskets, durable elastomeric wheels and tires (such as roller coaster, escalator, shopping cart, elevator, and skateboard wheels), automotive suspension bushings, electrical potting compounds, high performance adhesives, surface coatings and surface sealants, synthetic fibers (e.g., Spandex), carpet underlay, hard-plastic parts (e.g., for electronic instruments), and hoses.

Required Equipment to Produce Final Product

Figure 1:
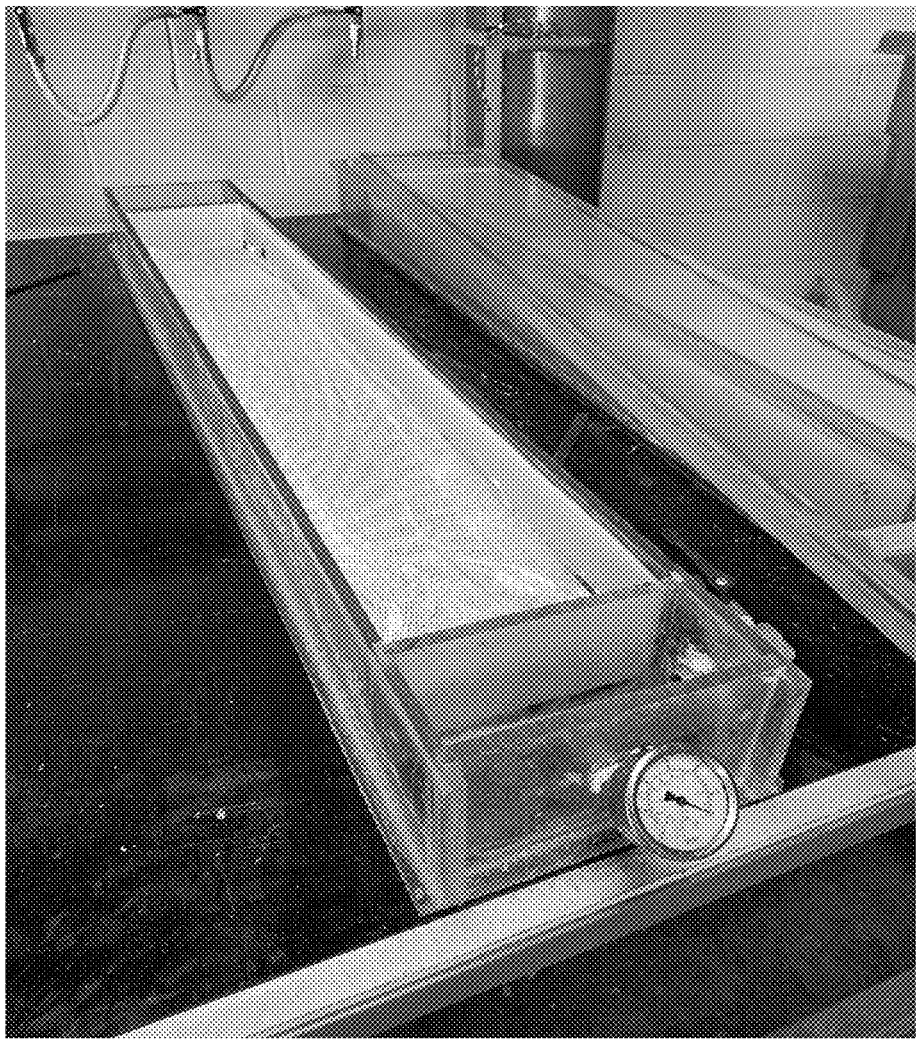
FIG. 1 is a perspective view of pressure chamber.

The method of making the engineered composite wood product of the present invention requires the following equipment:
1. A vacuum chamber suitably built to hold vacuum pressures of −29 in/hg to −30 in/hg (or −98.21 kilopascals to −101.59 kpa). See FIG. 1.
2. A vacuum pump operatively coupled to the vacuum chamber capable of pulling and maintaining −29 in/hg to greater than −30 in/hg.

Figure 2:
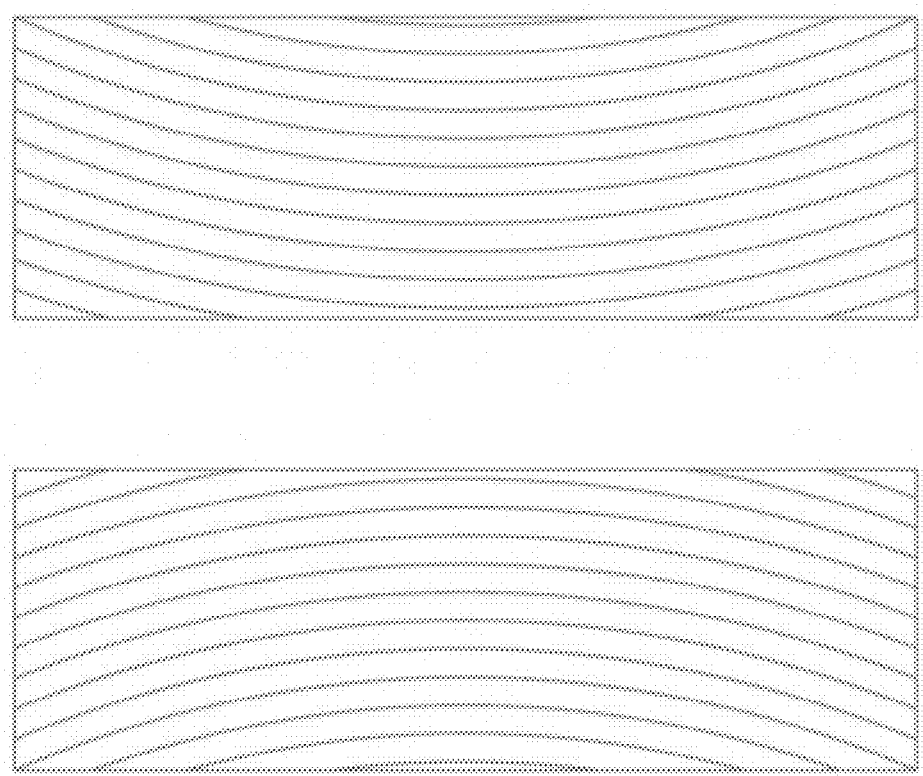
FIG. 2 is a sectional view of a first board and a second board illustrating a pitch side and an outer growth ring side of same.

Method for Making the Engineered Wood Composite Product of the Present Invention Process for Preparing the Wood Slabs or Boards
1. The wood boards are checked for appropriate MC.
2. Referring to FIG. 2, the boards are orientated with a pith (center of tree) orientated to the outer face of the finished product. The outermost growth rings is arranged to receive the PUR and war bias glass and is hereinafter, referred to as the glue face.
3. The boards are milled on at least the glue face on a machine capable of producing a flat/machined surface conforming to ASTM guidelines for flatness with a tolerance zone of +/−0.005 inches per 60 inches of length.

Process for Impregnating Warp Bias Fiberglass or similar reinforcing fiber with PUR Resin Polyurethane Resin (PUR) is the preferred adhesive due to its affinity to both wood and fiberglass. It shall be noted that other adhesives could be used with this process and could have equal or better results. Polyurethane resin was chosen because it was the best option available at the time of discovery. PUR requires H20 as a catalyst which is normally found in the ambient air and within the wood boards or slabs used in the present invention. Once PUR is exposed to its catalyst, it begins curing by cross linking polymer chains within the PUR. If the curing process takes place in an uncontrolled environment the molecular structure of the PUR begins to expand and molecules move farther apart. If the PUR is restricted from moisture, i.e., 99.99% free of H20, then the curing process will not begin, and the PUR molecules are free to be moved around without any concern of premature curing and therefore premature expansion. Thus, the PUR must be stored and delivered in an oxygen free environment. A pressurized nitrogen bath can be used to deliver the PUR to the reinforcement material without premature curing.

Figure 3:
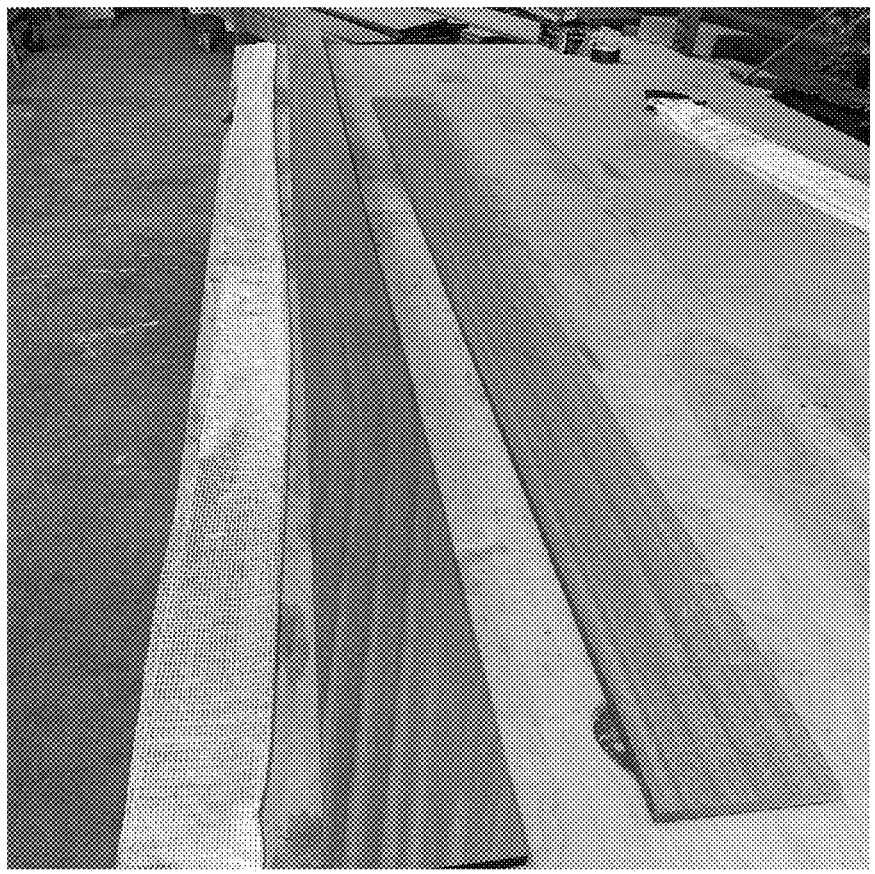
FIG. 3 is a perspective view a warp bias fiberglass yarn and a pair of wooden boards.
Figure 4:
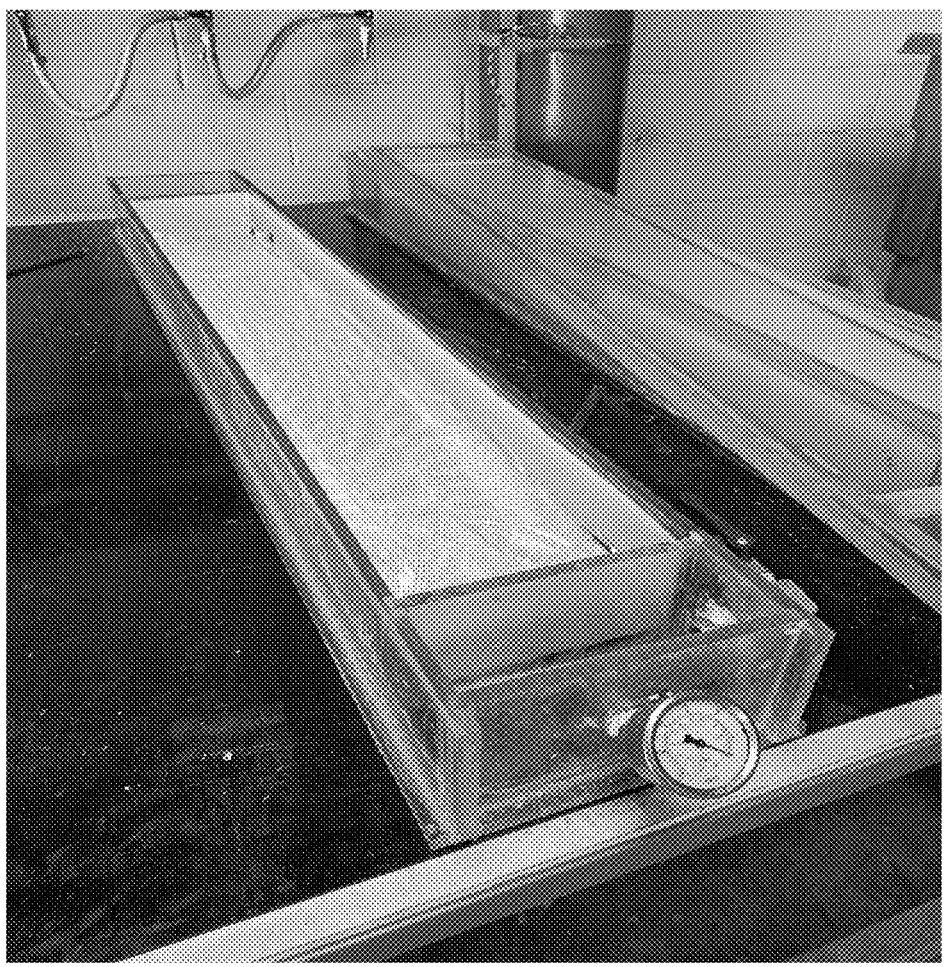
FIG. 4 is a perspective view of a vacuum chamber containing warp bias fiberglass yarn coated in a polyurethane resin.
Figure 5:
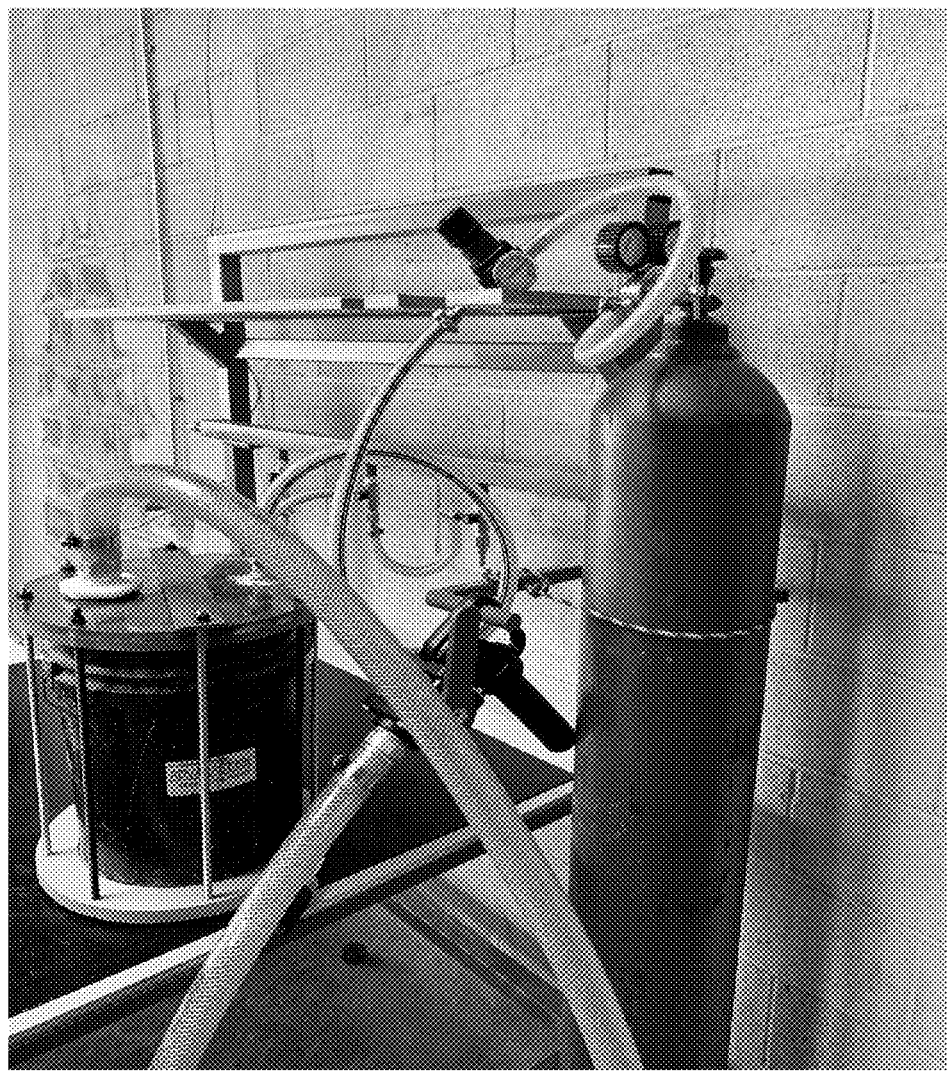
FIG. 5 is a perspective view of a nitrogen gas purge tank and vacuum pump that is operatively coupled to the vacuum chamber.
Figure 6:
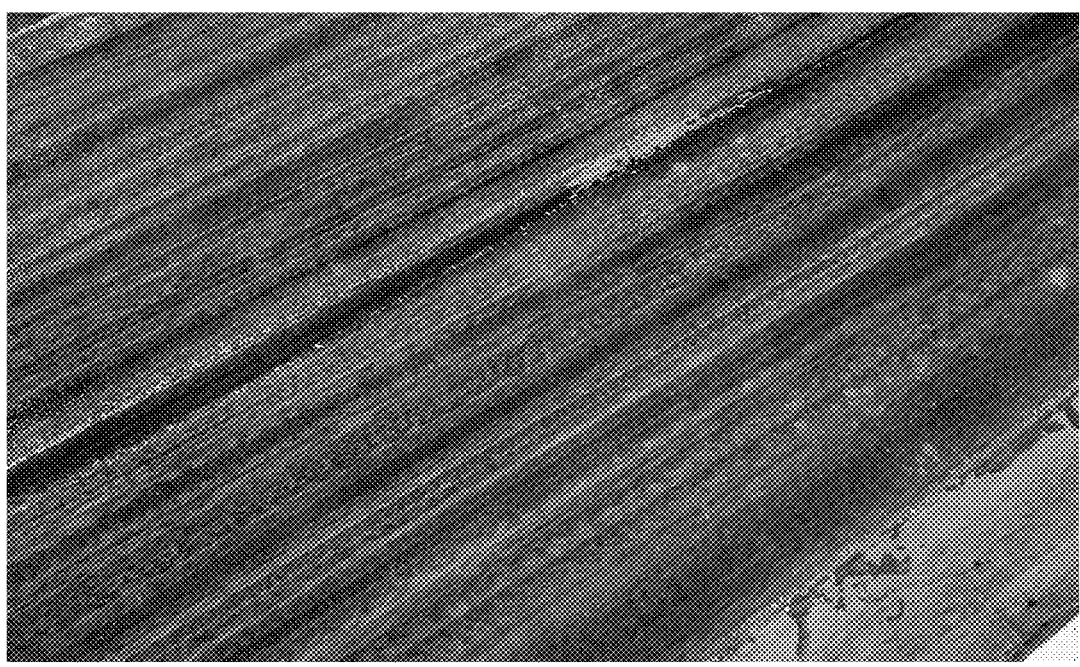
FIG. 6 is a perspective view of a wooden board with warp bias fiber yarn fully impregnated with resin.

According to the present invention the warp bias fiberglass is impregnated with PUR as follows:
1. Strips of reinforcing fiber (Warp bias fiberglass or carbon fiber) are cut to width to match the width of the finished glued product. See FIG. 3
2. Strips of reinforcing material are placed in the vacuum chamber. See FIG. 4.
3. PUR is introduced to material in a way that prevents exposure to oxygen and H20. In particular, care is taken to purge the vacuum chamber of oxygen by displacing it with nitrogen gas. See FIG. 5.
4. A ratio of 1:1 of PUR to fiber is placed in the vacuum chamber.
5. A full vacuum of −30 in/hg is achieved, and held until the fiber is impregnated with resin. One indication full impregnation of the fiber is that, if using glass fiber, the fiber becomes translucent. See FIG. 6

Description of Glass Fiber Orientation, with and without Resin, Improper Impregnation and Proper Impregnation.

Figures 7A, 7B:
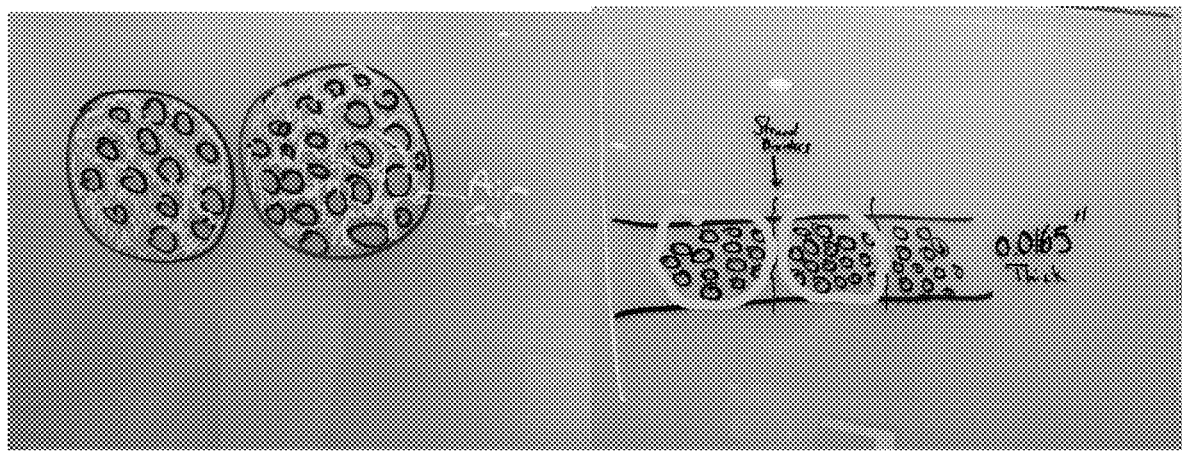
FIG. 7A is a sectional view of warp bias fiberglass yarn fibers in their natural state illustrating that the fibers are loosely organized with air space between the fibers.
FIG. 7B is a sectional view of warp bias fiberglass yarn fibers in their natural state illustrating that the fibers are loosely organized with air space between the fibers.
Figure 8:
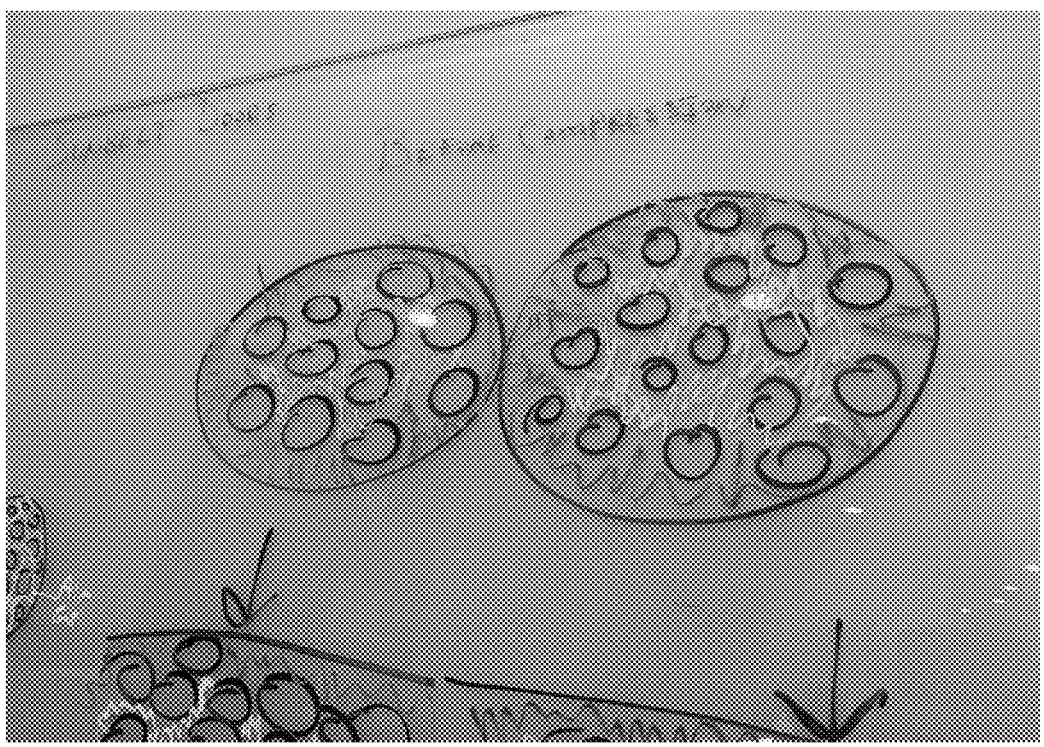
FIG. 8 is a sectional view of warp bias fiberglass yarn in their natural state impregnated with polyurethane resin illustrating air trapped within the resin.

The glass fibers are cylindrical extrusions of glass with a diameter of less than 0.0003" (about 10 times smaller than a human hair.) The glass fibers are grouped together into a yarn, which contains several hundred fibers. In its natural state, the fibers are loosely organized with air space between the fibers. See FIGS. 7A and 7B. The vacuum process facilitates the complete displacement of air with PUR resin. Incomplete vacuum impregnation results in the PUR trapping air inside the collection of fibers. In this scenario the PUR also adds to the overall thickness of the yarn. See FIG. 8. As depicted in FIG. 8, the purple is the PUR and the yellow represents entrapped air inside the group of fibers.

Figure 9:
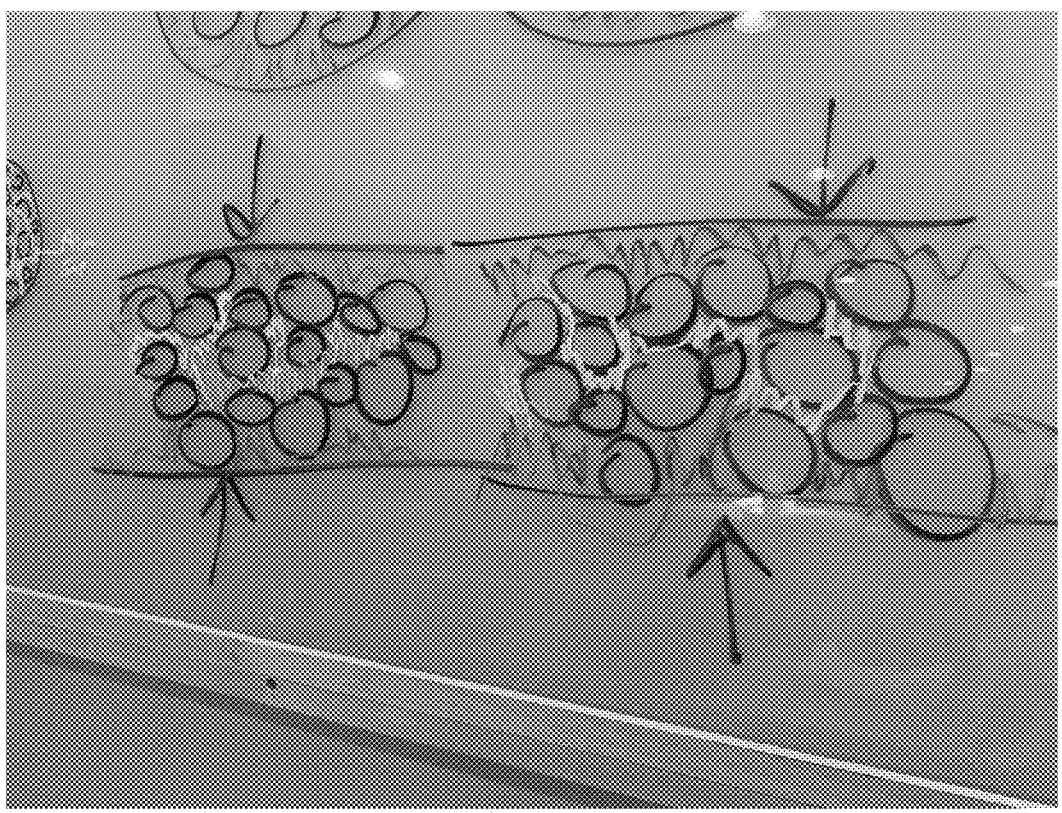
FIG. 9 is a sectional view of warp bias fiberglass yarn impregnated with polyurethane resin and compressed illustrating entrapped air inside the compressed fibers and resin.

Referring to FIG. 9, prior to the PUR impregnated fiber being are compressed between the boards, as hereinafter described, the purple represents PUR and yellow the entrapped air inside the compressed fibers. PUR is highly water resistant, and also when the glue joint is under compression it becomes airtight as well. The PUR effectively seals the air inside the fibers which results in a weakened bond line, and therefore is not protected from warp and twist.

Importance of Complete Impregnation of Glass Fiber with PUR

Figure 10:
FIG. 10 is a sectional view of warp bias fiberglass yarn impregnated with polyurethane resin under vacuum in accordance with the present invention illustrating no air trapped inside of the resin.
Figure 11:
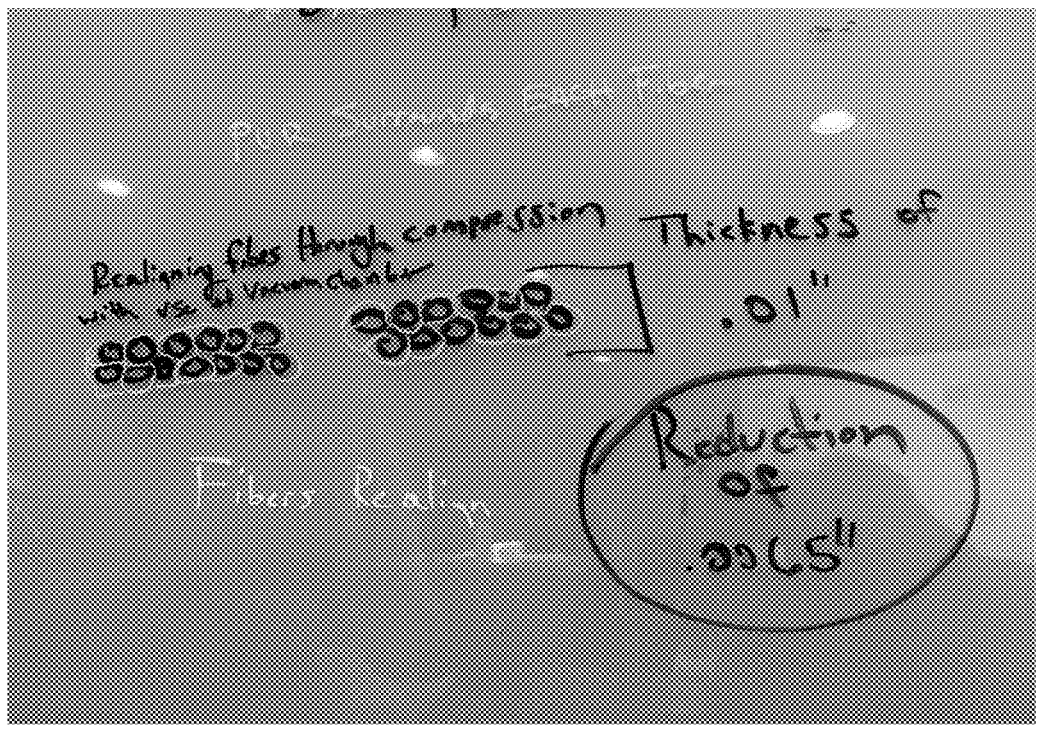
FIG. 11 is a sectional view of warp bias fiberglass yarn impregnated with polyurethane resin under vacuum in accordance with the present invention illustrating a reduced thickness of the yarn following compression.

It is crucial that complete impregnation of the reinforcing glass fiber be achieved. When this process is done as outlined above, each glass fiber is surrounded by PUR, and all of the air is displaced. Referring to FIGS. 10 and 11, this type of bond results in realignment of the glass fibers, from a random displacement to a consistent displacement, with PUR resin adhering each fiber together, and filling any void spaces with hard resin. In FIGS. 10 and 11, the white portions represent PUR completely surrounding fibers. When the process is completed as described, the result is a solid bond line that shrinks in overall thickness by about 0.0065" after compression.

Figure 12:
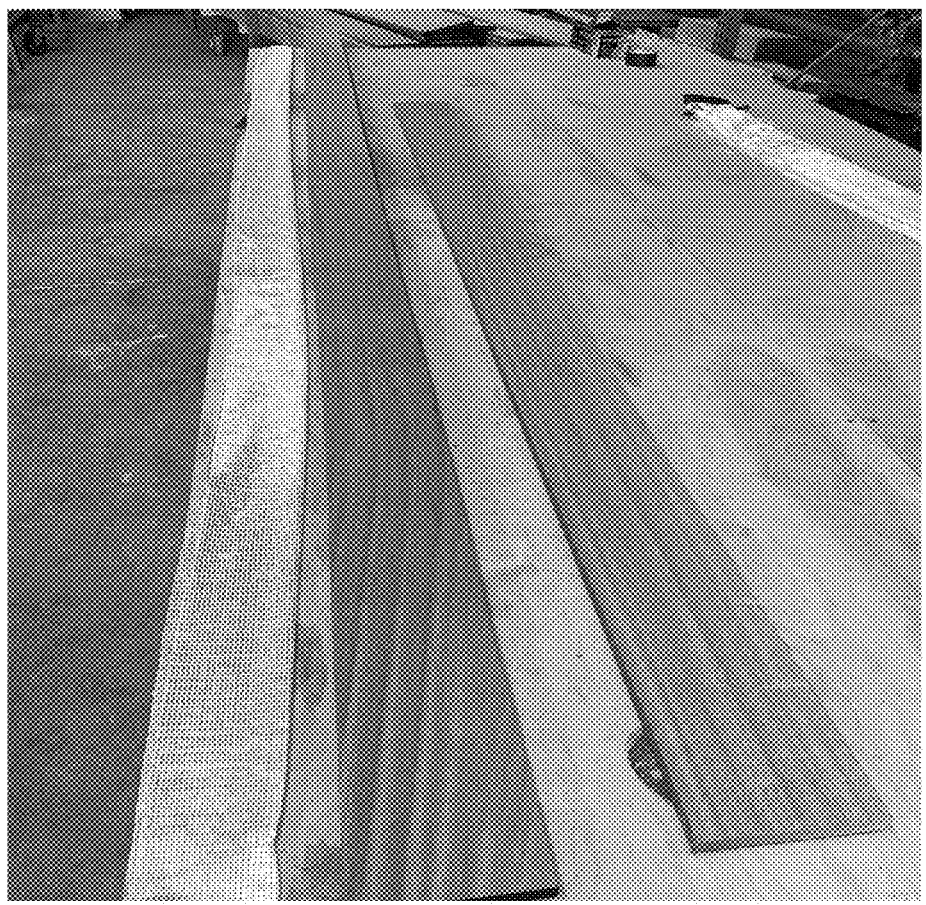
FIG. 12 is a perspective view a warp bias fiberglass yarn and a pair of wooden boards.

Process for Applying Reinforcing Fiber to Wood
1. Referring to FIG. 12, the boards are placed on flat surface with glue faces, orientated facing upward.
2. Vacuum pressure is removed from chamber.
3. When using PUR resin, a light mist of water is applied to both glue faces of wood.
4. Strips of impregnated fiber are removed from chamber and laid across the glue face on the wood.
5. One final mist of water is applied to the reinforcing fiber on the wood glue face.
6. A piece of wood, oriented as stated above, is applied to the glue face.

Figure 15:
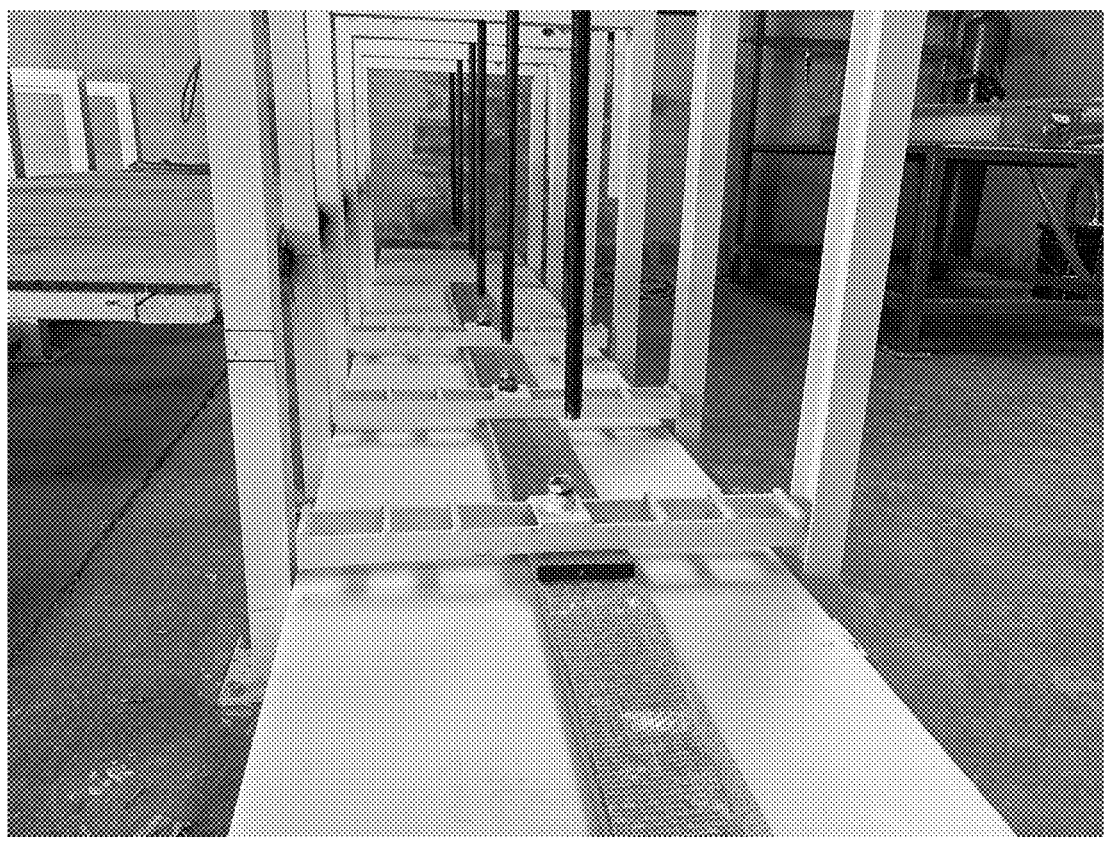
FIG. 15 is a perspective view of a platen and press used to compress the warp bias fiberglass saturated with polyurethane resin between two wood boards.

Pressing Process
1. Referring to FIG. 15, the wood boards are placed in a press and pressed against a "reference platen" that has been milled to a flatness tolerance zone of ASTM+/− 0.003 inches/168".
2. A minimum of 60 lbs/psi must be applied evenly across the flat surface of the engineered product.
3. The pressed boards are removed from the press after a sufficient amount of time per the resin manufacturers specifications.

If the wood preparation process, the impregnation process and the pressing process have been done correctly, there should be a thinning of the reinforcing fiber which is a result of the fibers realigning themselves with the flat referenced flat surfaces.

Fiber Characteristics Before and after Impregnation and Pressing

Warp-Bias Fiberglass (10.5 oz) was used in in the example of the present invention described above, although we found statistically similar relative results using woven carbon fiber; however, for the purpose of this description warp-bias fiberglass is the reference.

The warp-bias fiberglass has a dry thickness of 0.0165".

After impregnation and pressing under the above conditions we achieved a 0.0065" "thinning" of the glue-line.

The PUR was presented to the fibers in such a way that it was able to completely surround each and every fiber in the woven strands.

When the entire process is done correctly, the fibers are able to lay down beside one another and thin to a wet thickness of 0.01.

Final Product

Figure 16:
FIGS. 16 through 18 illustrate a engineered composite wood product made in accordance with the method of the present invention.
Figure 17:
Figure 18:
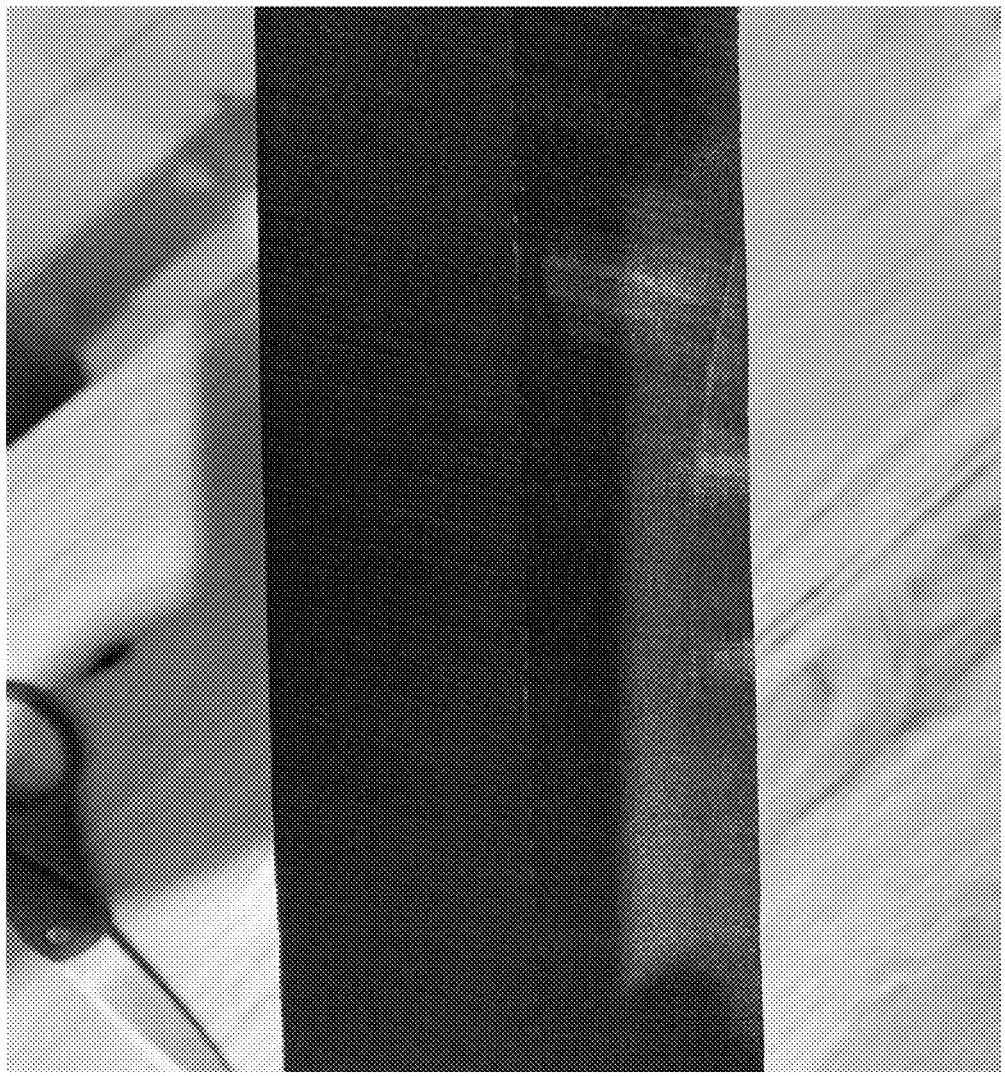
Figure 19:
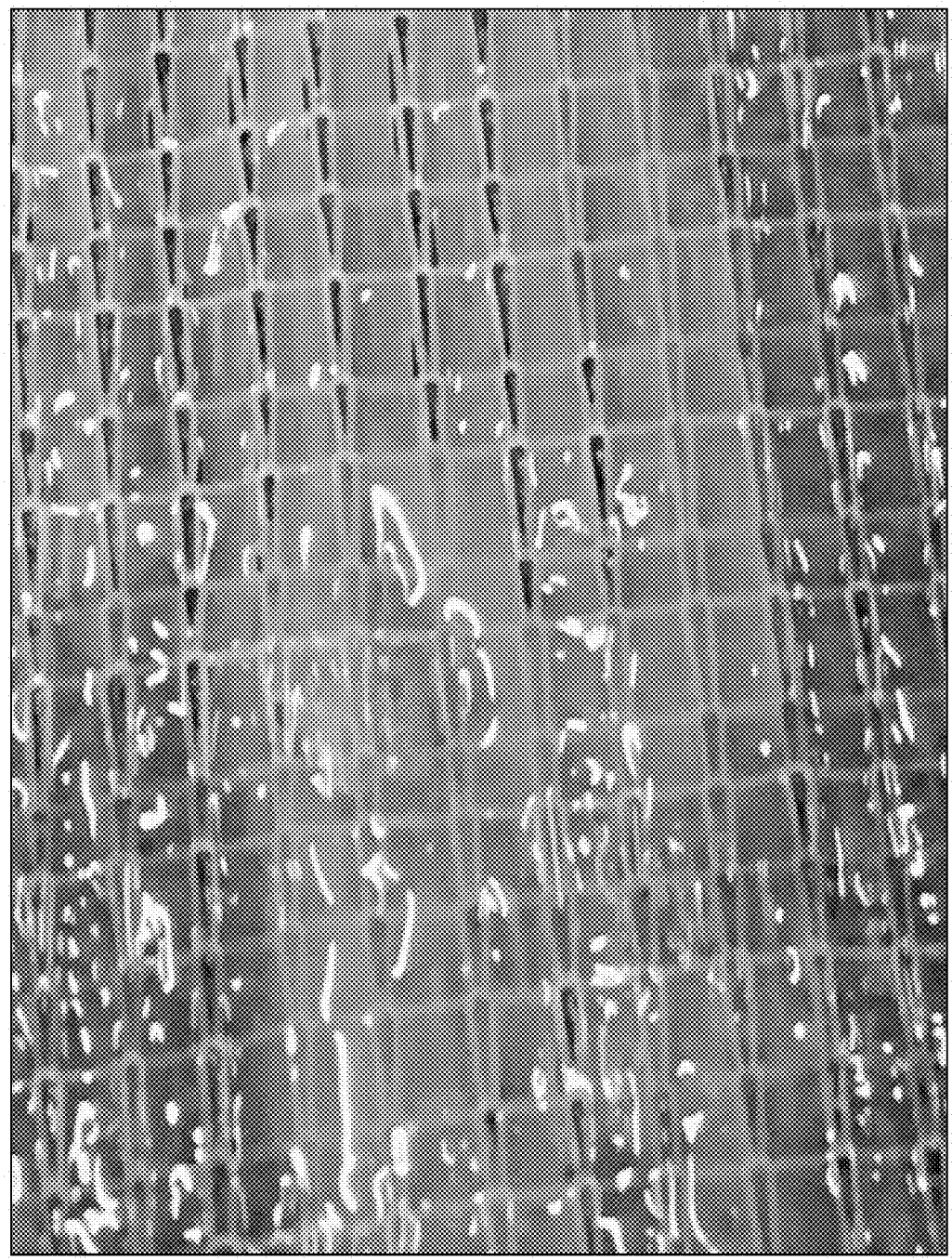
FIG. 19 is a perspective view of warp bias fiberglass yarn impregnated with polyurethane resin illustrating in the white portions thereof air trapped inside of the yarn.
Figure 20:
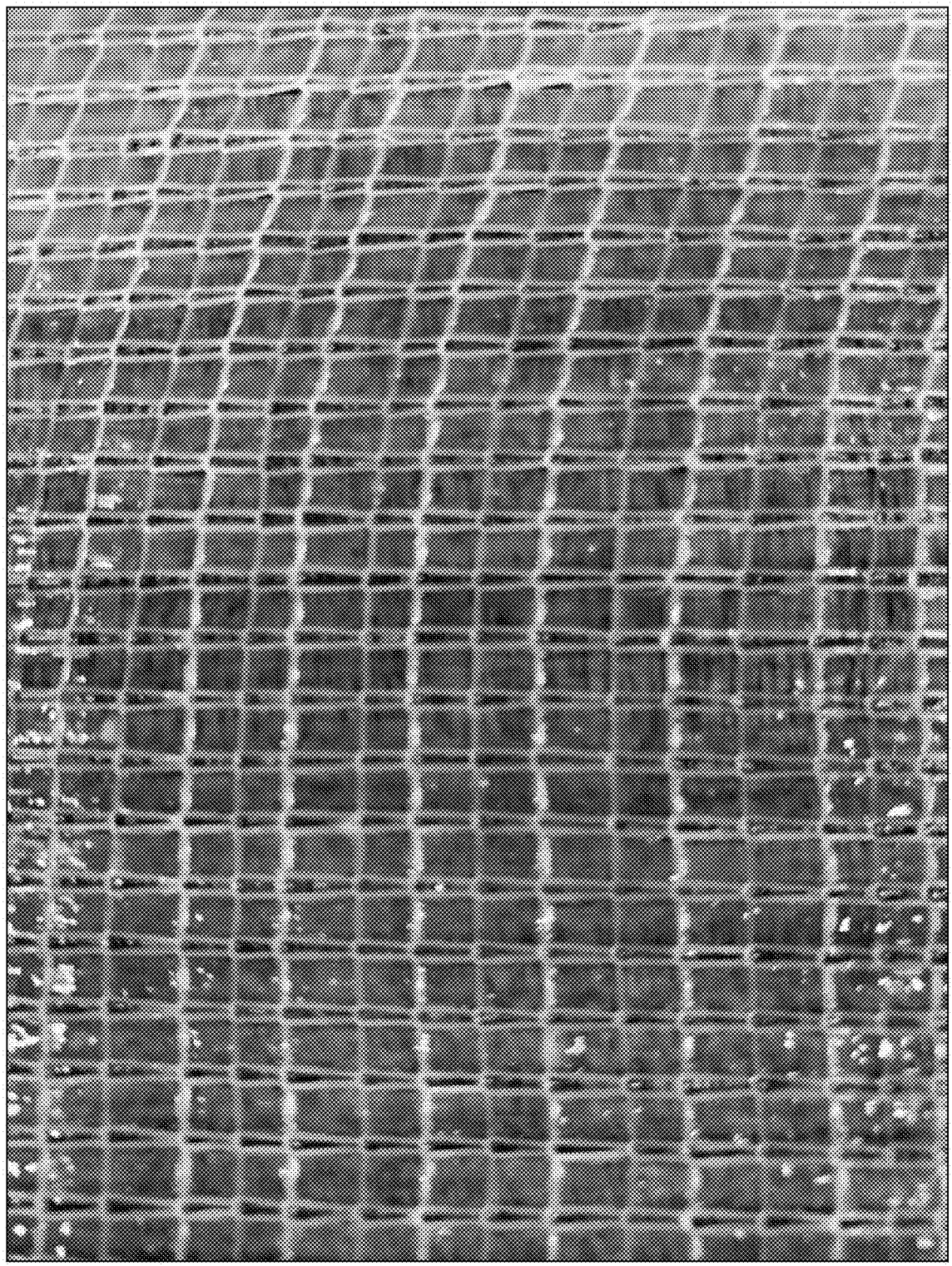
FIG. 20 is a perspective view of warp bias fiberglass yarn impregnated with polyurethane resin under vacuum in accordance with the present invention illustrating the removal of all air from inside of the yarn.

Referring to FIGS. 16-18, the final product exhibits a near invisible bond line, many multiples stronger than native wood. The bond line can be placed in multiples in the wood piece, and mixed with fire retardant to accomplish fire ratings that were not possible with wood before. The line can be painted or stained so it can be used where a solid wood appearance aesthetic is sought.

Producing Fire Rated Wood Panels Using this Process

The method described above may be used to make fire-rated wood panels without the need to treat the wood in a separate process. In order to produce fire rated panels and/or lumber, one simply needs to add fire retardant to the PUR mixture in combination with the vacuum process described above. The addition of various concentrations of fire retardant is normally accomplished by the adhesive manufacturer in concert with a chemist. Once the PUR has fire retardant added, the process of impregnation of the fiber stays the same as mentioned above, however the placement of the impregnated fabric will change, as illustrated in FIG. 13.

Figure 13:
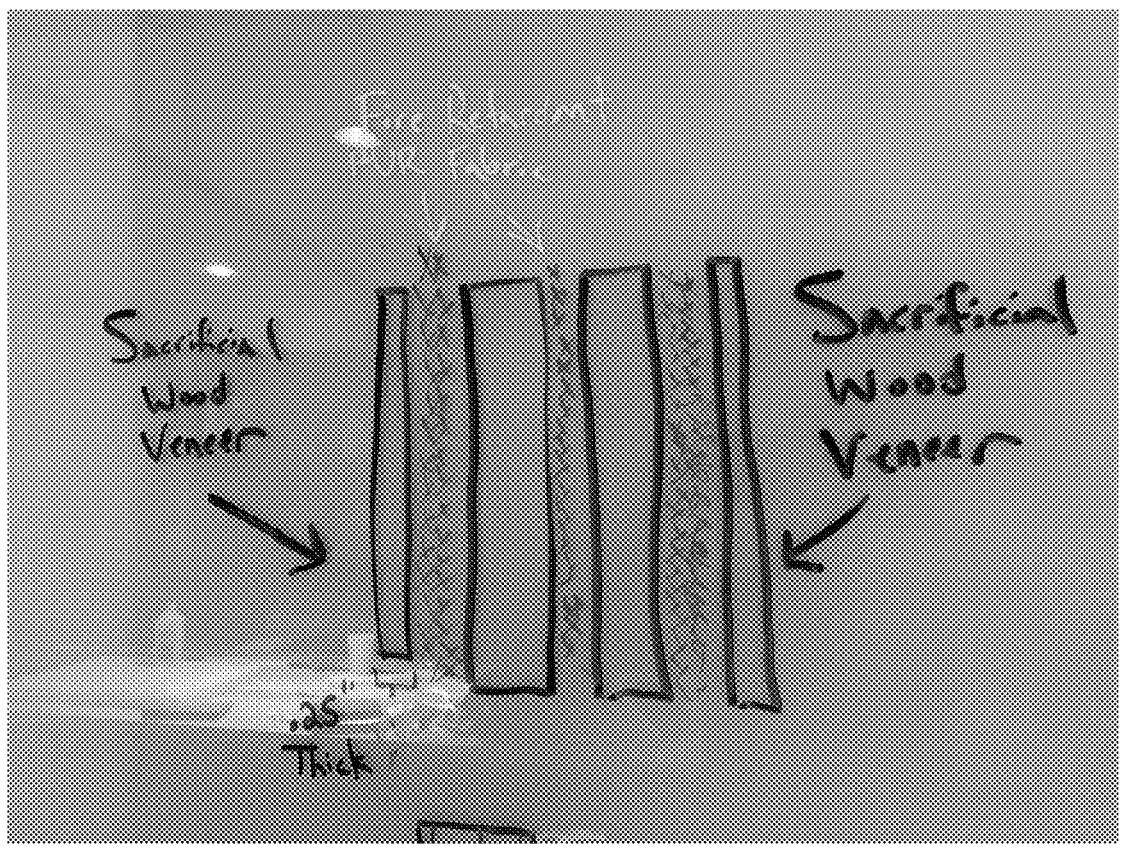
FIG. 13 is a sectional view of a fire resistant engineered wood product made in accordance with the present invention.
Figure 14:
FIG. 14 is a sectional view of a fire resistant engineered wood product made in accordance with the present invention.

Referring to FIGS. 13 and 14, there are two sacrificial pieces of wood veneer that are placed on the outer faces of the lumber/panel. The sacrificial pieces of veneer are designed to burn away in a fire, which will leave the fire resistant reinforced fiber mat to protect the core of the panel. When used in door construction, this process easily withstands the fire hose test that is required by most independent certifying labs. The fire protection that is provided is directional in nature, i.e. it protects the structural core from the fire. Wood is a natural thermal insulator due to its open cellular structure within its fibers. The process of reinforcing wood with Fire Retardant PUR through the vacuum process described above allows the wood to remain structurally intact in the event of a fire. The engineered product can be made to withstand fire from a single direction, i.e. as in the case of a fire rated exterior door; or multiple directions which would be useful in building fire rated interior doors.

I claim:

1. A method of making a wood product comprising:
   providing a first board and a second board, each of the first board and the second board having a moisture content of 5% to 9%,
   forming a flat surface of +/−0.005 inches per 60 inches of length on each of the first board and the second board by milling a first face of the first board and a first face of the second board on a machine capable of producing a flat/machined surface conforming to ASTM guidelines for flatness with a tolerance zone of +/−0.005 inches per 60 inches of length,
   cutting a first strip of reinforcing fiber selected from the group consisting of warp bias fiberglass, carbon fiber and combinations thereof to a width and a length that is equal to a width and a length of the first board and/or the second board,
   saturating the first strip with a polyurethane resin (PUR) by placing the first strip in a vacuum chamber, purging oxygen from the vacuum chamber by displacing the oxygen with nitrogen, creating a vacuum at −30 in/hg in the vacuum chamber, applying a polyurethane resin (PUR) to the first strip in a ratio of 1:1 PUR to strip and maintaining the −30 in/hg vacuum for an amount of time sufficient to fully saturate the first strip with the PUR whereby each and every filament of the first strip is completely surrounded by the PUR, all voids in the strip are displaced by the PUR, filaments that compose the first strip are realigned and a thickness of the first strip is decreased from an average thickness of about 0.0165 inches to an average thickness of about 0.0065 inches,
   arranging the first board and the second board with each first face thereof facing upwards and applying a mist of water to each of the first faces of the first and second boards,
   removing the PUR saturated first strip from the vacuum chamber and arranging the PUR saturated first strip between the first face of the first board and the first face of the second board, and
   compressing the PUR saturated first strip between the first face of the first board and the first face of the second board to thereby form the wood product by placing the first board, the second board and the PUR saturated first strip in a press and pressing against a reference platen that has been milled to a flatness tolerance zone of ASTM+/−0.003 inches per 167 inches of length at a minimum of 601 bs/psi for an amount of time sufficient for the PUR to cure.

2. The method of claim 1 wherein each of the first face of the first board and the first face of the second board is formed by an outer tree-ring side of the respective boards.

3. The method of claim 1 including adding a fire retardant preparation to the PUR.

4. The method of claim 1 including,
   providing a first veneer and a second veneer,
   cutting a second strip and a third strip of reinforcing fiber selected from the group consisting of warp bias fiberglass, carbon fiber and combinations thereof to the width and the length that is equal to the width and the length of the first board and/or the second board,
   saturating the second strip and the third strip with a polyurethane resin (PUR) containing a fire retardant by placing the second strip and the third strip in the vacuum chamber, purging oxygen from the vacuum chamber by displacing the oxygen with nitrogen, creating a vacuum at −30 in/hg in the vacuum chamber, applying a polyurethane resin (PUR) to the second strip and the third strip in a ratio of 1:1 PUR to strip and maintaining the −30 in/hg vacuum for an amount of time sufficient to fully saturate the second strip and the third strip with the PUR whereby each and every filament of the second strip and the third strip is completely surrounded by the PUR, all voids in the second strip and the third strip are displaced by the PUR, filaments that compose the second strip and the third strip are realigned and a thickness of the second strip and the third strip is decreased from an average thickness of about 0.0165 inches to an average thickness of about 0.0065 inches,
   compressing the PUR saturated second strip between a second face of the first board and the first veneer and the PUR saturated third strip between a second face of the second board and the second veneer to thereby form a fire retardant wood product by placing the first board, the second board, the first veneer, the second veneer and the PUR saturated second and third strips in a press and pressing same against a reference platen that has been milled to a flatness tolerance zone of ASTM+/− 0.003 inches per 167 inches of length at a minimum of 60 1bs/psi for an amount of time sufficient for the PUR to cure.

\* \* \* \* \*